Aug. 10, 1937.    C. A. RITCHIE    2,089,298
HOG SCRAPER PADDLE
Filed April 15, 1936
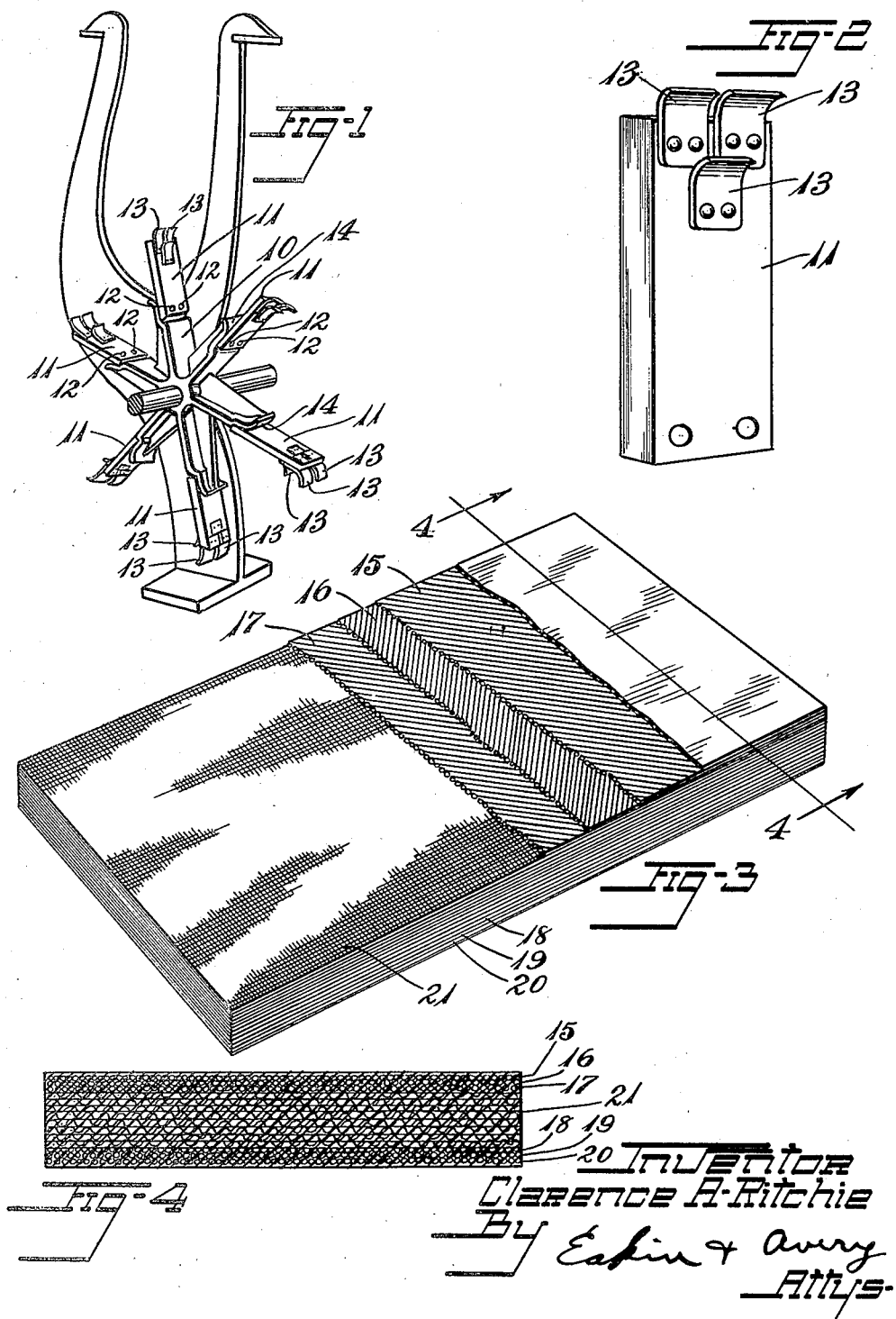

Patented Aug. 10, 1937

2,089,298

UNITED STATES PATENT OFFICE 2,089,298

HOG SCRAPER PADDLE

Clarence A. Ritchie, Akron, Ohio, assignor to The B. F. Goodrich Company, New York, N. Y., a corporation of New York Application April 15, 1936, Serial No. 74,483

8 Claims. (Cl. 17—18)

This invention relates to flexible paddles such as are employed in machines for removing hair from the carcasses of slaughtered hogs.

Heretofore it has been common to make such paddles of rubberized square woven fabric and deterioration usually has occurred near the base of the paddle, where it is attached to the rotary member on which it is mounted, the flexure of the paddle in service being largely localized in that region.

The chief object of my invention is to provide an improved paddle adapted to withstand the repeated and long continued flexures under heavy strain which is incident to the service in which such paddles are employed.

Of the accompanying drawing:

Fig. 1 is a perspective view of one of the units of a hog dehairing machine embodying my invention in its preferred form.

Fig. 2 is an elevation of one of the paddles with a set of scraper blades mounted upon its outer end.

Fig. 3 is a perspective view of the paddle, parts being sectioned and broken away for purposes of illustration.

Fig. 4 is a section on line 4—4 of Fig. 3.

Referring to the drawing, 10 is one of the rotary members of a hog de-hairing machine, 11, 11 are flexible paddles secured thereto by rivets 12, 12, and 13, 13 are scraper blades mounted on the outer ends of the paddles.

The arms of the rotary member are formed with curved faces 14, 14 for compelling a substantial distribution of the flexure of the paddles as the latter are bent against such faces in the operation of the machine, but this expedient has not been wholly adequate to prevent premature failure of the paddle adjacent its anchorage, before the rest of the paddle has depreciated to any substantial degree, when square woven fabric has been used as the reinforcement.

In my improved paddle I employ alternately biased layers of weak-wefted or weftless rubberized cord fabric as the reinforcement, at least in the regions near the broad faces of the paddle, layers of such fabric being shown at 15, 16, 17 and 18, 19, 20, although without greatly stiffening the paddle or causing early failure from localized flexing I may employ layers of square woven fabric, as at 21, in the middle region or "neutral zone" of the paddle, where the material is not put under very great tensile or compressive strains by the bending of the paddle and where, consequently, there is relatively little sawing of one cord on another in the distortion of the paddle.

Such use of the square woven fabric in the middle region of the paddle is believed to be of advantage in conjunction with the cord-fabric layers, in providing an appropriate amount of stiffness without involving a highly destructive sawing action.

The weak-wefted or weftless cord fabric being used as the reinforcement in those regions, near the broad faces of the paddle, in which the material is subjected to strong tensile and compressive strains, the layers of cord can shift with relation to each other by distortion of the layers of rubber between them, so that the destructive sawing of cords across each other is avoided and at the same time ample tensile strength is provided and the paddle consequently has relatively long life.

The bias or oblique disposition of the cords in the cord fabric layers also has the advantage that it provides reinforcing elements adapted to sustain directly torsional strains in the paddle such as inevitably occur in the operation of the machine and this is believed to account in considerable measure for the superiority of the paddle described.

I claim:

1. A hog-scraper paddle comprising a body of rubber and a layer of substantially weftless cord fabric as a reinforcement therein.

2. A hog-scraper paddle comprising a body of rubber and a layer of bias, substantially weftless cord fabric as a reinforcement therein.

3. A hog-scraper paddle comprising a layer of square-woven rubberized fabric in an inner region thereof and a layer of substantially weftless rubberized fabric in a region thereof nearer to one of the broad faces of the paddle.

4. A hog-scraper paddle comprising a layer comprising a set of substantially weftless cords and a binder therefor.

5. A hog-scraper paddle comprising a layer of rubber composition having embedded therein layers of cords disposed diagonally of the paddle in crossed relation.

6. A hog-scraper paddle comprising a layer of woven fabric providing a neutral axis for the bending of the paddle, a layer of rubber upon the fabric layer, and layers of cords embedded in the rubber in diagonally disposed and crossed relation.

7. A hog-scraper paddle comprising a pliable body having a scraper attached at one end thereof, and being attached at its opposite end to a supporting member, said pliable body having a neutral zone comprising a plurality of layers of square woven rubberized fabric, and layers of cords embedded in rubber on each side thereof providing regions of flexure, said cords being disposed diagonally of the paddle so as to resist twisting forces.

8. A hog-scraper paddle comprising a pliable body having a scraper attached at one end thereof and being attached at its other end to a supporting member, said pliable body having a neutral zone comprising a plurality of layers of square woven fabric, a layer of rubber at each side of the fabric zone, and layers of cords embedded in the rubber, the cords of adjacent layers being disposed diagonally of the paddle and in crossed relation providing zones of relatively free flexure outwardly of the neutral axis.

CLARENCE A. RITCHIE.